United States Patent

Bert

(10) Patent No.: US 8,977,799 B2
(45) Date of Patent: Mar. 10, 2015

(54) STORAGE CACHING/TIERING ACCELERATION THROUGH STAGGERED ASYMMETRIC CACHING

(75) Inventor: Luca Bert, Cumming, GA (US)

(73) Assignee: LSI Corporation, San Jose, CA (US)

( * ) Notice: Subject to any disclaimer, the term of this patent is extended or adjusted under 35 U.S.C. 154(b) by 668 days.

(21) Appl. No.: 13/245,167

(22) Filed: Sep. 26, 2011

(65) Prior Publication Data

US 2013/0080696 A1 Mar. 28, 2013

(51) Int. Cl.
G06F 12/00 (2006.01)
G06F 13/00 (2006.01)
G06F 3/06 (2006.01)
G06F 12/08 (2006.01)

(52) U.S. Cl.
CPC .......... *G06F 3/0613* (2013.01); *G06F 12/0866* (2013.01); *G06F 3/065* (2013.01); *G06F 3/0685* (2013.01)
USPC ........................ 711/4; 711/103; 711/E12.083

(58) Field of Classification Search
CPC .................................................... G06F 3/0685
See application file for complete search history.

(56) References Cited

U.S. PATENT DOCUMENTS

| 7,502,886 | B1 | 3/2009 | Kowalchik et al. | |
|---|---|---|---|---|
| 2007/0118691 | A1* | 5/2007 | Therene et al. | 711/114 |
| 2007/0150693 | A1* | 6/2007 | Kaneko et al. | 711/202 |
| 2009/0292875 | A1* | 11/2009 | Therene et al. | 711/114 |
| 2010/0191897 | A1* | 7/2010 | Zhang et al. | 711/103 |
| 2010/0199036 | A1* | 8/2010 | Siewert et al. | 711/112 |
| 2011/0093651 | A1* | 4/2011 | Kurashige | 711/103 |
| 2011/0153931 | A1* | 6/2011 | Bell et al. | 711/114 |
| 2011/0283066 | A1* | 11/2011 | Kurashige | 711/135 |
| 2012/0057407 | A1* | 3/2012 | Montgomery et al. | 365/185.17 |
| 2012/0173801 | A1* | 7/2012 | Sasaki | 711/103 |
| 2012/0317338 | A1* | 12/2012 | Yi et al. | 711/103 |
| 2013/0054882 | A1* | 2/2013 | Ryu | 711/103 |
| 2014/0229657 | A1* | 8/2014 | Karamov et al. | 711/103 |

OTHER PUBLICATIONS

Muppalaneni, Nitin, et al., "A Multi-tier RAiD Storage System with RAID1 and RAID5", 9 pages, IEEE, 2000.

* cited by examiner

*Primary Examiner* — Sean D Rossiter
(74) *Attorney, Agent, or Firm* — Suiter Swantz pc llo

(57) ABSTRACT

A multi-tiered system of data storage includes a plurality of data storage solutions. The data storage solutions are organized such that the each progressively faster, more expensive solution serves as a cache for the previous solution, and each solution includes a dedicated data block to store individual data sets, newly written in a plurality of write operations, for later migration to slower data storage solutions in a single write operation.

20 Claims, 5 Drawing Sheets

US 8,977,799 B2

STORAGE CACHING/TIERING ACCELERATION THROUGH STAGGERED ASYMMETRIC CACHING

FIELD OF THE INVENTION

The present invention is directed generally toward data storage systems and more particularly toward a method for implementing variable performance storage devices in a single system.

BACKGROUND OF THE INVENTION

Data storage technology focuses on providing the greatest capacity and availability, with the greatest performance, at a minimum cost. RAID technology increased the capacity of data storage systems for minimal cost by combining multiple independent, inexpensive hard disk drives into a large array. Later RAID technology increased data availability by adding fault tolerance at the expense of capacity and performance.

State of the art data storage systems are beginning to incorporate solid state drive (SSD) technology. SSDs are arrays of semiconductor memory elements, so every memory element is accessible with electrical signals as opposed to a hard disk drive which relies on mechanically spinning disks and mechanically actuated arms. SSDs are orders of magnitude faster than hard disk drives. SSDs are also more expensive than hard disk drives per unit of data storage.

Some data storage technologies have attempted to combine the performance of SSDs with the high capacity per unit cost of hard disk drives, but the high disparity in performance tends to negate the performance advantage of SSDs for any operation that accesses the hard disk drive.

Any data storage system attempting to incorporate multiple tiers of data storage devices to take advantage of the performance characteristics of each device will necessarily lose all of those performance advantages whenever the system performs an operation involving the slowest tier, such as a write operation. To provide data integrity, redundant fields are added, wasting capacity of faster, more expensive tiers, and slowing performance because of redundant write operations.

Consequently, it would be advantageous if a method and apparatus existed that are suitable for minimizing performance slowing operations and redundant capacity usage in a system having more than one storage tier, each storage tier having superior performance characteristics as compared to the previous tier.

SUMMARY OF THE INVENTION

Accordingly, the present invention is directed to a novel method and apparatus for minimizing low performance operations in a system having more than one storage tier, each storage tier having superior performance characteristics as compared to the previous tier.

One embodiment of the present invention is a data storage device having a processor, a first data storage functioning as a cache for a second data storage, and memory with a segregated data block. When write operations would overwrite data in the first storage device, the processor writes the new data to the first storage device and to the segregated data block. After a number of write operations have written new data to the segregated data block such that the segregated data block has reached a predetermined data limit, the processor copies the data to the second data storage.

Another embodiment of the present invention is a data storage system having multiple tiers of data storage, each tier a cache to the next higher tier. When write operations would overwrite data in a certain tier, a processor writes the new data to that tier and to a segregated data block in the next lower tier. After a number of write operations have written new data to that segregated data block, the processor copies the data to the next higher tier where the data has not yet been written and purges the segregated data block.

Another embodiment of the present invention is a method for consolidating write operations in a data storage system having multiple tiers of data storage, each tier a cache to the next higher tier. The method includes writing a plurality of data sets to a tier where the first data hit occurs and to a segregated data block in the next lower tier. The method further includes copying the segregated data block to the next higher tier where the data has not been written when the segregated data block reaches a predetermined data limit.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
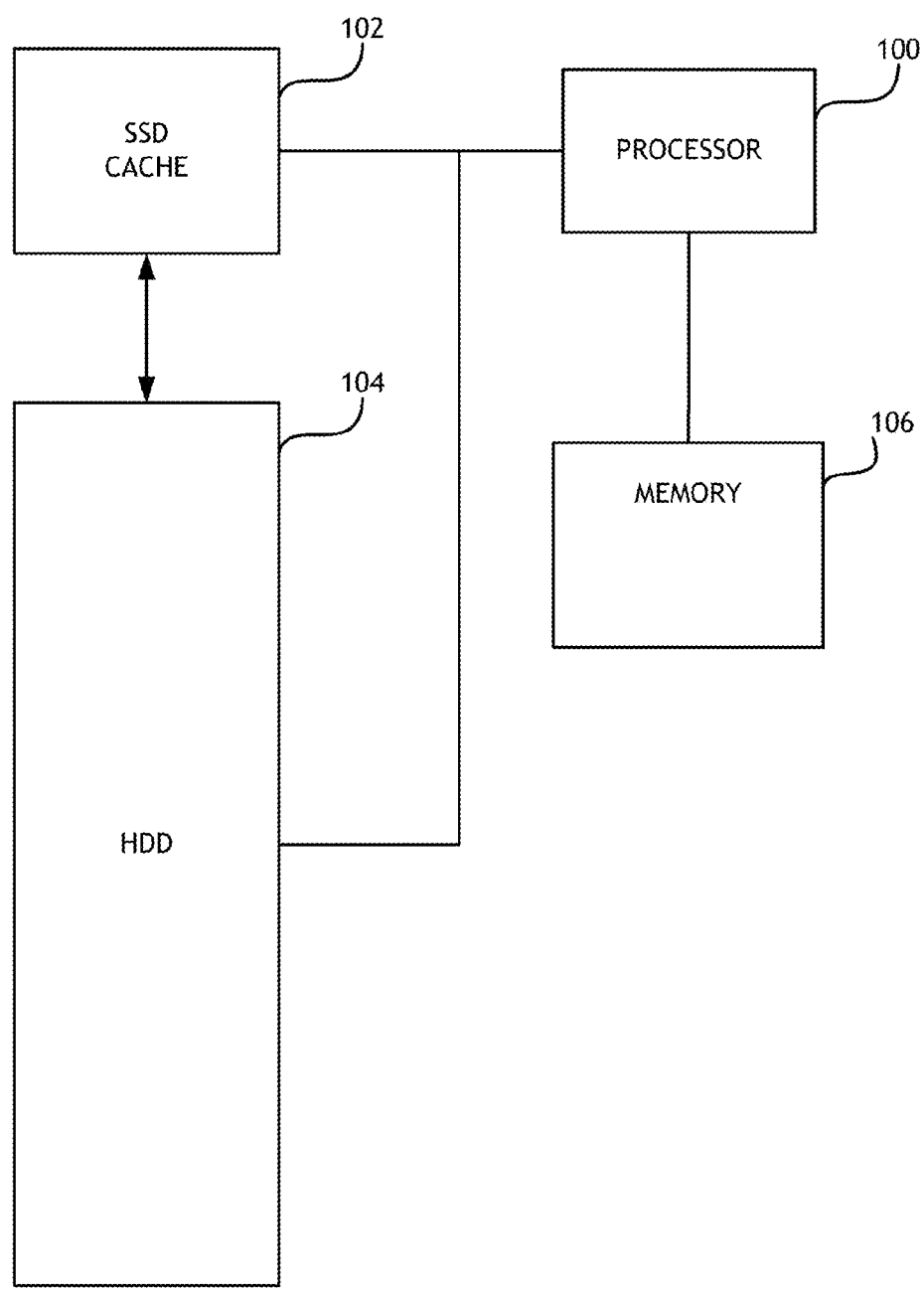
FIG. 1 shows a block diagram of a data storage device having a hard disk drive and an SSD cache.

Referring to FIG. 1, one implementation of a data storage device using SSD and hard disk drives is a hard disk drive with an SSD cache. The device may include a processor 100 and memory 106 connected to one or more hard disk drives 104 and one or more SSDs 102 functioning as a cache for each of the one or more hard disk drives 104. In a RAID architecture, the device may include an array of hard disk drives 104 and a corresponding array of SSDs 102 functioning as caches. In a typical cache implementation, the SSD 102 may have roughly ten percent the capacity of the hard disk drive 104, though those skilled in the art will appreciate that larger or smaller cache implementations are possible. In this device, read operations have performance that is roughly inversely proportional to the hit rate of the cache. The hit rate is the percentage of read operations that find the requested data in the cache. Because read operations take orders of magnitude longer to perform on a hard disk drive 104 than an SSD 102, the amount of time spent performing read operations can be estimated as the amount of time the hard disk drive 104 spends performing a read operation multiplied by the inverse of the hit rate. Therefore, for read operations, improving the hit rate improves performance of the data storage device.

Using existing technology, write operations do not benefit from an increased hit rate. Write operations, like read operations, are orders of magnitude faster when writing to SSDs 102 than when writing to hard disk drives 104. However, data written only to the cache is not redundantly stored in any other location. In the event the cache becomes corrupted, newly written data would be lost. For that reason, in a data storage device having one or more caches for one or more hard disk drives 104, write operations have always been performed on the appropriate cache and the corresponding hard disk drive 104. Such a system ensures redundancy but completely negates the advantages of SSD 102 caches during write operations.

Figure 2:
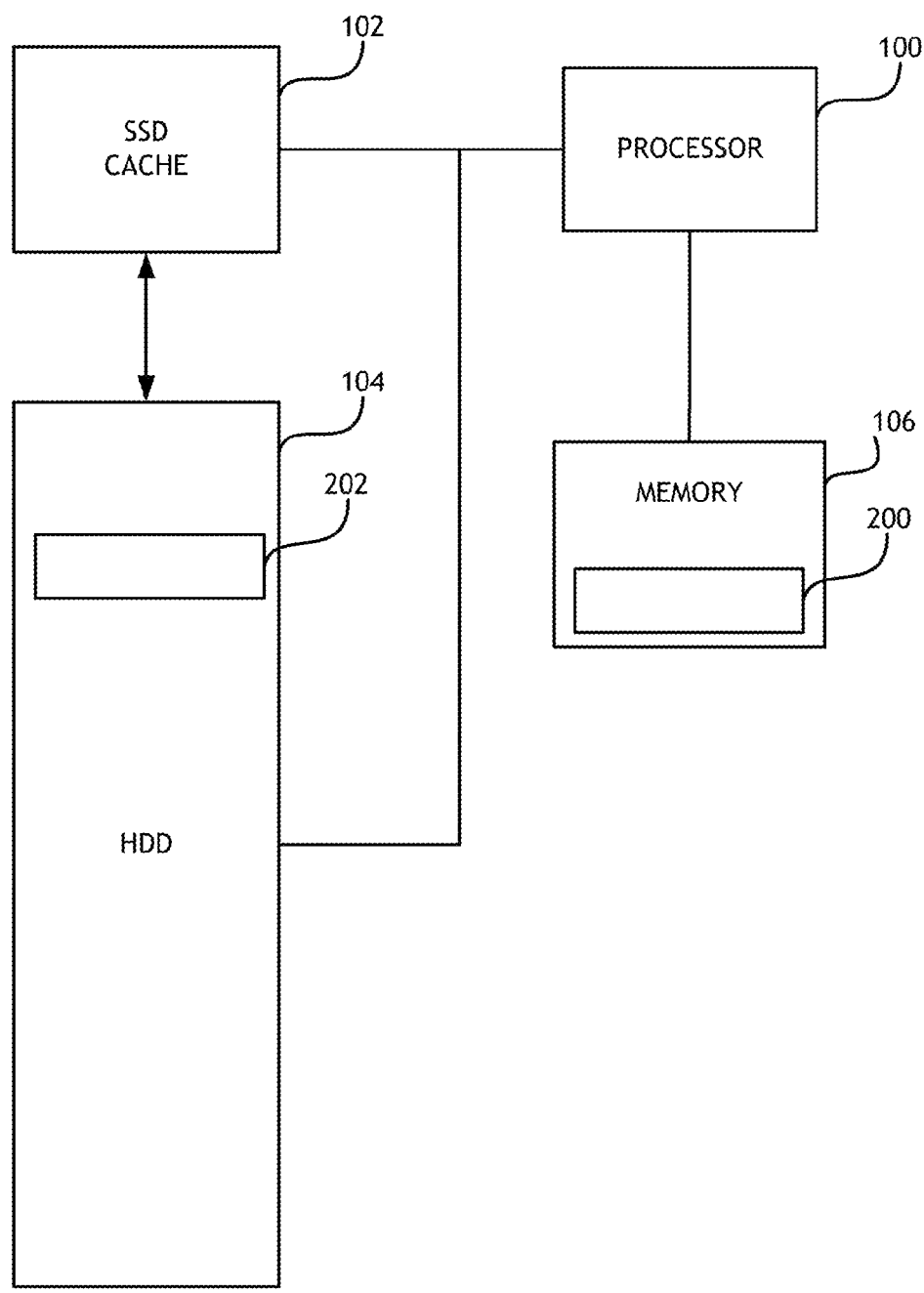
FIG. 2 shows a block diagram of a data storage device having a hard disk drive and an SSD cache where the device memory includes a segregated data block.

Referring to FIG. 2, a data storage device having a hard disk drive 104 and an SSD 102 serving as a cache for the hard disk drive 104 is shown. The device may also include a processor 100 and memory 106. The memory 106 may include a segregated data block 200. Whenever a write operation attempts to overwrite data in the SSD 102 cache, the processor 100 may overwrite the data in the SSD 102 cache, and write the same data to the segregated data block 200. The segregated data block 200 may accommodate data from a plurality of independent write operations. When the amount of data in the segregated data block 200 reaches a predetermined data limit, the data in the segregated data block 200 may be written to the hard disk drive 104 in a single write operation. A single write operation to the hard disk drive 104 is faster than multiple write operations writing the same amount of data because a single write operation minimizes the mechanical movement of the hard disk drive 104.

By consolidating multiple write operations to a relatively slower data storage device into a single write operation, and maintaining the data to be written in a segregated data block 200 of a separate storage device, a data storage device with a relatively higher speed cache has both data redundancy and improved performance corresponding to the hit rate of the cache. While FIG. 2 depicts a device having a hard disk drive 104 and SSD 102 cache, the same principle applies to data storage systems having several tiers.

Figure 3:
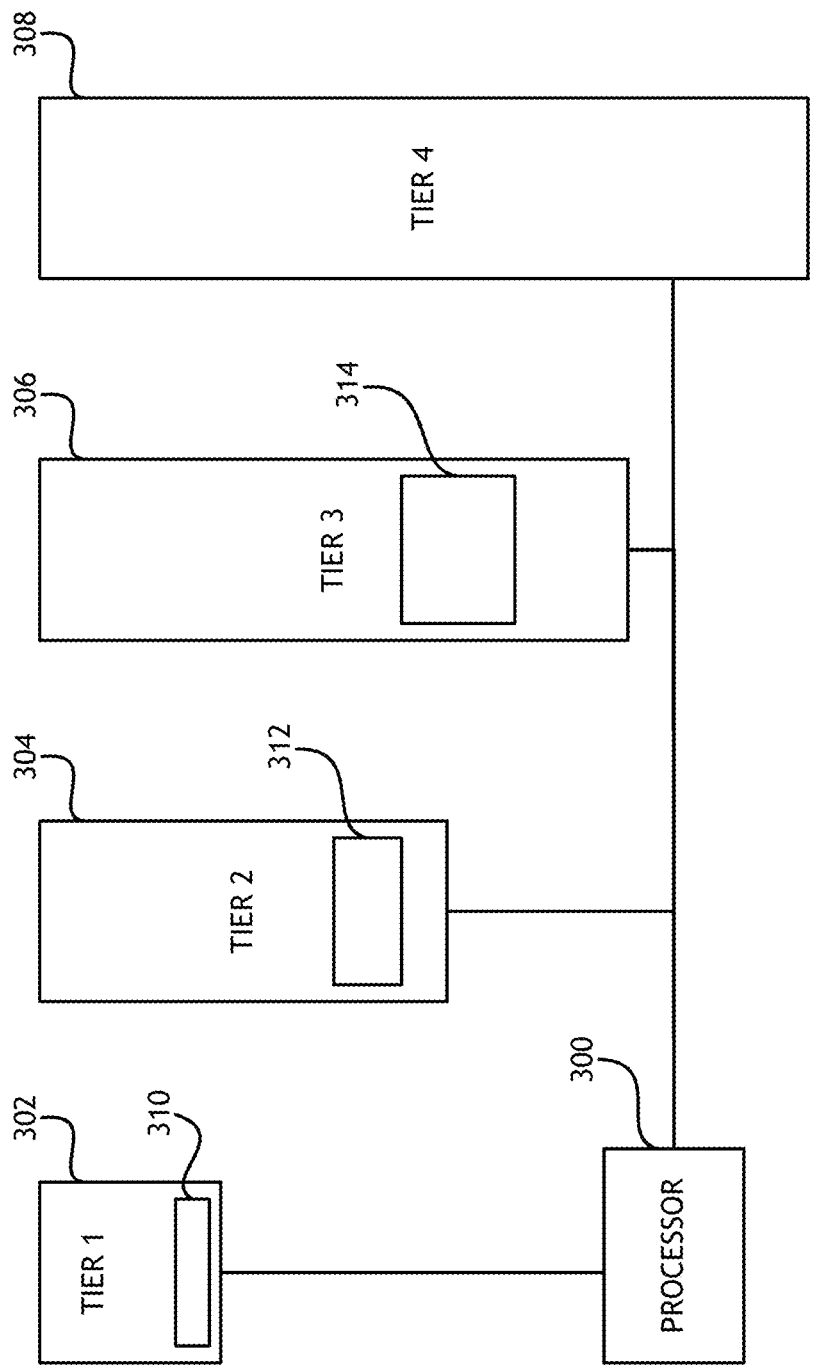
FIG. 3 shows a block diagram of a data storage system having multiple tiers where all but the highest level tier includes a segregated data block.

Referring to FIG. 3, a data storage system having four tiers is shown. The system may have a first tier storage device 302 with a first tier data block 310, a second tier storage device 304 with a second tier data block 312, a third tier storage device 306 with a third tier data block 314 and a fourth tier storage device 308. The system may also include a processor 300 for executing various read and write operations. The first tier storage device 302 may be system memory, or a cache for the second tier storage device 304. The second tier storage device 304 may be a cache for the third tier storage device 306. The third tier storage device 306 may be a cache for the fourth tier storage device 308. Each tier 302, 304, 306, 308 may be progressively slower and larger than the last. For example, the fourth tier storage device 308 may be a 'cloud' storage solution or a tape library while the third tier storage device 306 may be a local hard disk drive 104 with relatively less storage space but relatively faster access time. As a cache, the third tier storage device 306 may store a subset of the total data stored on the fourth tier storage device 308. The second tier storage device 304 may be a SSD 102 with relatively less storage space than the third tier storage device 306, but relatively faster access time. As a cache, the second tier storage device 304 may store a subset of the data stored on the third tier storage device 306. The first tier storage device 302 may be system memory. Because the second tier storage device 304 is a cache of the third tier storage device 306 and the third tier storage device 306 is a cache of the fourth tier storage device 308, any hit at the second tier storage device 304 will necessarily hit at the third tier storage device 306 and the fourth tier storage device 308. Therefore, any data newly written to the second tier storage device 304 must also eventually be written to the third tier storage device 306 and the fourth tier storage device 308.

Where a write operation attempts to modify data cached in the second tier storage device 304, the data in the second tier storage device 304 is overwritten and the same data is written to the first tier data block 310. The first tier data block 310 is a segregated data block of the first tier storage device 302 to temporarily store newly written data until such data can be efficiently written to the third tier storage device 306. The first tier data block 310 may accommodate data from multiple write operations. When the amount of data stored in the first tier data block 310 reaches a predetermined limit, the processor 300 may write the data to the third tier storage device 306 and purge the first tier data block 310 so that the first tier data block 310 can begin to accept new write operations. The processor 300 may also write the data to the second tier data block 312. The second tier data block 312 is a segregated data block of the second tier storage device 304 to temporarily store newly written data until such data can be efficiently written to the fourth tier storage device 308. The second tier data block 312 may accommodate data from multiple write operations. When the amount of data stored in the second tier data block 312 reaches a predetermined limit, the processor 300 writes the data to the fourth tier storage device 308 and purges the second tier data block 312 so that the second tier data block 312 can begin to accept new write operations.

Newly written data may not hit every tier in a data storage system. For example, a write operation may attempt to overwrite data cached in the third tier storage device 306 but not cached in the second tier storage device 304. In that case, the data in the third tier storage device 306 may be overwritten and corresponding new data may be written to the second tier data block 312. The second tier data block 312 may accommodate data from multiple write operations. When the amount of data stored in the second tier data block 312 reaches a predetermined limit, the processor 300 may write the data to the fourth tier storage device 308 and purge the second tier data block 312 so that the second tier data block 312 can begin to accept new write operations.

Using the present data storage system, the number of write operations to each successive tier may be minimized by consolidating a plurality of write operations in a cache. Newly written data is always maintained in at least two separate locations so that for the period of time when newly written data is stored only in a cache, the newly written data can always be recovered after a single failure.

Figure 4:
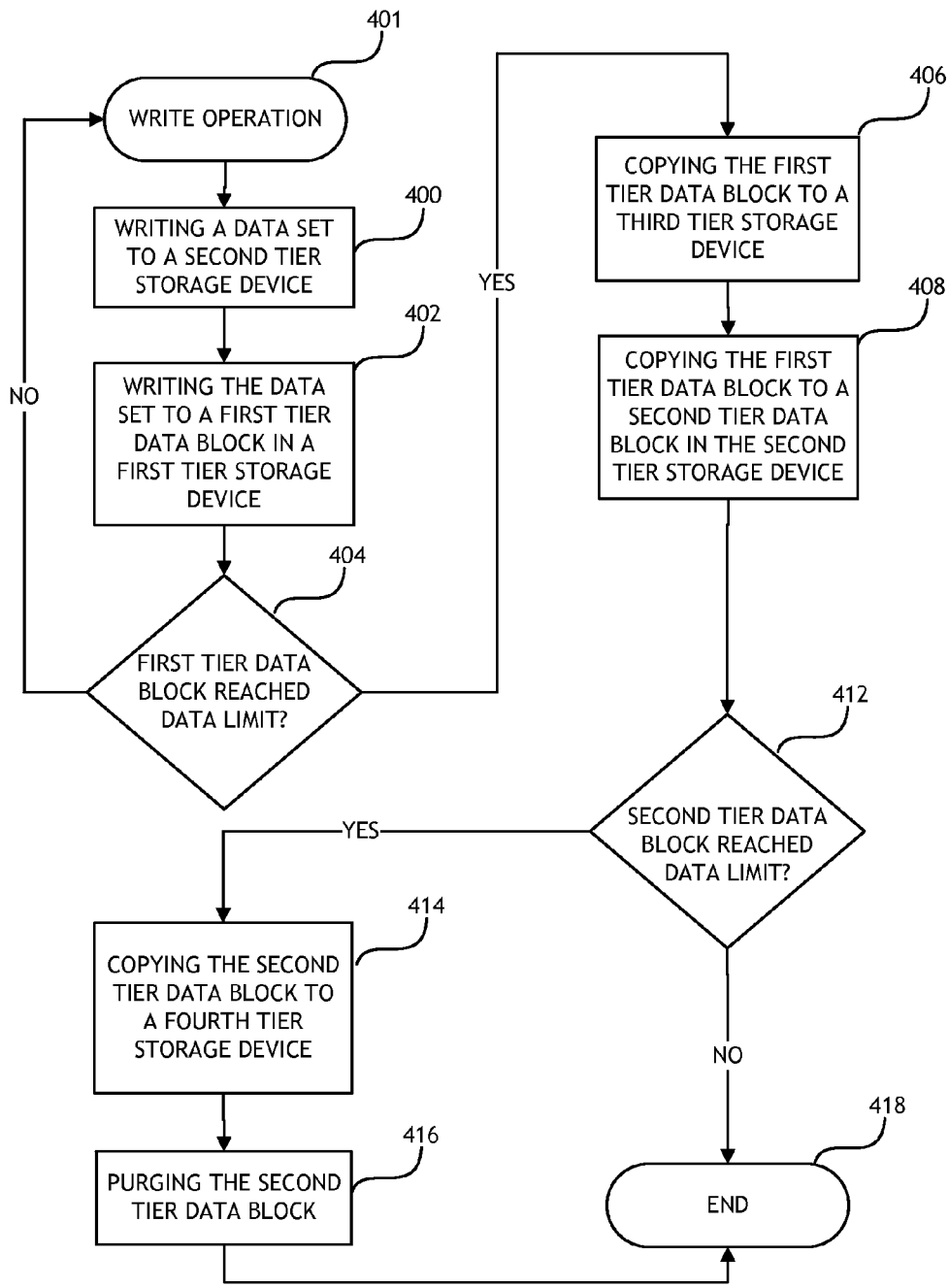
FIG. 4 shows a flowchart of a method for writing new data in a multi-tiered data storage system at the lowest tier level.

Referring to FIG. 4, a flowchart for minimizing write operations in a data storage system with a first tier storage device 302, a second tier storage device 304 and a third tier storage device 306 is shown. When a write operation 401 attempts to overwrite data found in the second tier storage device 304, the data storage system may write 400 the new data set to the second tier storage device 304. The second tier storage device 304 may be a cache for a third tier storage device 306. The data storage system may contemporaneously write 402 the data set to a first tier data block 310 in a first tier storage device 302. Write operations 401 attempting to overwrite data found in the second tier storage device 304 may continue to write 400 to the second tier storage device 304 and write 402 to the first tier data block 310 until the data storage system determines 404 the first tier data block 310 has reached a predetermined data limit. When the first tier data block 310 reaches the predetermined data limit, the data storage system may copy 406 the data in the first tier data block 310 to the third tier storage device 306. By this method all newly written data sets are migrated to the largest capacity, slowest storage device with a minimum number of write operations in a data storage system with three tiers. Total performance of the system during write operations is thereby improved. In a data storage system with more than three tiers, the data storage system may also copy 408 the first tier data block 310 to a second tier data block 312 in the second tier storage device 304. The data storage system may then determine if the second tier data block 312 has reached a predetermined limit. If the second tier data block 312 has reached a predetermined limit, the data storage system may copy 414 the second tier data block 312 to a fourth tier storage device 308 and purge 416 the second tier data block 312. In a four tier data storage system, all newly written data is migrated to the highest level tier and the process ends 418. In a data storage system with more than four tiers, the process may continue in a similar manner until all new write operations 401 are migrated to the highest level tier.

At each tier 302, 304, 306, the storage device may include a data block 310, 312, 314 with a predetermined data limit. The predetermined data limit may be configured to maximize efficiency in write operations between tiers based on the characteristics of the storage device implementing each tier 302, 304, 306, 308. For example, where the third tier storage device 306 is a hard disk drive, the third tier storage device 306 may be able to write a certain number of megabytes of data in a given track before moving the head actuator. The first tier data block 310 may therefore have a predetermined limit less than but nearly equal to that certain number of megabytes to maximize the amount of data that may be written to the third tier storage device 306 before moving the head actuator which is a limiting factor in the speed of operations to a hard disk drive.

Figure 5:
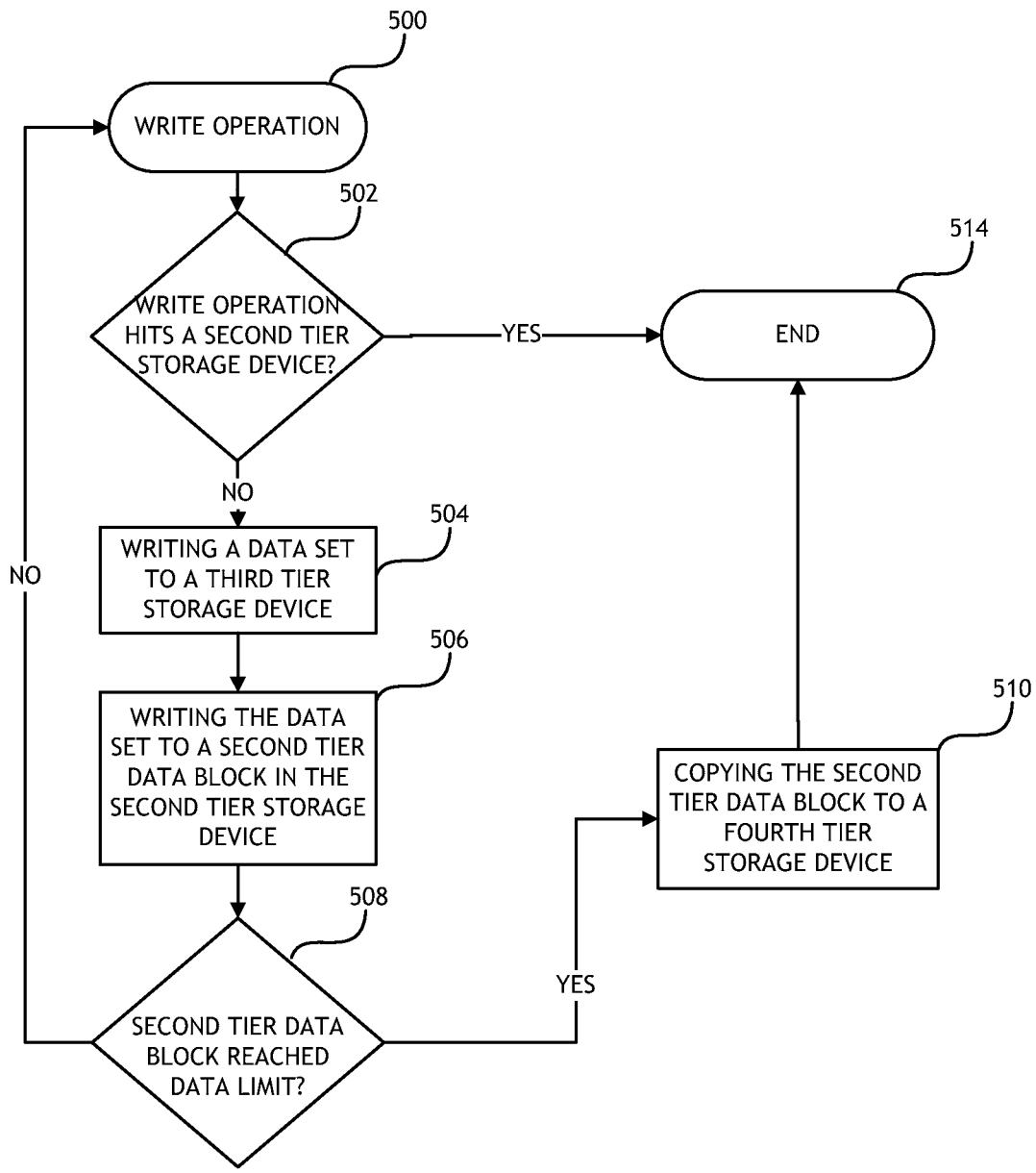
FIG. 5 shows a flowchart of a method for writing new data in a multi-tiered data storage system at other than the lowest tier level.

Referring to FIG. 5, a flowchart is shown for minimizing write operations in a data storage system with a first tier storage device 302, a second tier storage device 304, a third tier storage device 306 and a fourth tier storage device 308 when a new data write does not hit the lowest tier. When a write operation 500 attempts to overwrite data found in the third tier storage device 306, the data storage system may determine 502 that a data hit does not occur at a second tier storage device 304. The data storage system may then write 504 the new data set to the third tier storage device 306. The third tier storage device 306 may be a cache for a fourth tier storage device 308. The data storage system may contemporaneously write 506 the data set to a second tier data block 312 in the second tier storage device 304. Write operations 500 attempting to overwrite data found in the third tier storage device 306 may continue to write 504 to the third tier storage device 306 and write 506 to the second tier data block 312 until the data storage system determines 508 the second tier data block 312 has reached a predetermined data limit. When the second tier data block 312 reaches the predetermined data limit, the data storage system may copy 510 the data in the first second data block 312 to the fourth tier storage device 308. By this method all newly written data sets are migrated to the largest capacity, slowest storage device with a minimum number of write operations in a data storage system with four tiers. Total performance of the system during write operations is thereby improved.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus comprising:
a processor;
memory connected to the processor;
a first storage device comprising a solid state drive connected to the processor;
a second storage device comprising a hard disc drive connected to the processor; and
computer executable code stored in the memory, and configured to:
maintain a first data block in the memory having a size corresponding to a size, within one megabyte, of a track on the second storage device, writable without moving a head actuator, said first data block corresponding to a pre-determined block of memory addresses;
perform two or more independent write operations to the first storage device;
perform the two or more independent write operations on the first data block; and
copy data from the first data block in a single write operation to the second storage device when the first data block reaches a data capacity limit.

2. The apparatus of claim 1, wherein the first storage device is configured as a cache for the second storage device.

3. The apparatus of claim 1, wherein the first storage device is a solid state drive and the second storage device is a hard disk drive.

4. The apparatus of claim 1, wherein the first storage device is a hard disk drive and the second storage device is a cloud storage.

5. The apparatus of claim 1, further comprising a third storage device, wherein the computer executable program code is further configured to:
maintain a second data block in the first storage device, said second data block corresponding to a pre-determined block of memory addresses;
perform two or more independent write operations to the second storage device;
perform the two or more independent write operations on the second data block; and
copy the second data block in a single write operation to the third storage device when the data block reaches a data capacity limit.

6. The apparatus of claim 5, wherein the first storage device is configured as a cache for the second storage device and second storage device is configured as a cache for the third storage device.

7. The apparatus of claim 5, wherein the third storage device is a cloud storage.

8. A method, executed by a processor in a data storage system, comprising:

writing two or more independent data sets to a second tier storage;

writing the two or more independent data sets to a first tier data block in a first tier storage;

determining that the first tier data block has reached a data capacity limit, said data capacity limit corresponding to a physical limitation of the second tier storage such that writing data in excess of the data capacity limit requires a physical manipulation of the second tier storage; and copying the first tier data block as a single data set to a third tier storage.

9. The method of claim 8, wherein the second tier storage is configured as a cache for the third tier storage.

10. The method of claim 8, wherein the second tier storage is a solid state drive and the third tier storage is a hard disk drive.

11. The method of claim 8, further comprising:

writing two or more independent data sets to the third tier storage;

writing the two or more independent data sets to a second tier data block in the second tier storage;

determining that the second tier data block has reached a data capacity limit; and copying the second tier data block as a single data set to a fourth tier storage.

12. The method of claim 11, wherein third tier storage is configured as a cache for the fourth tier storage.

13. The method of claim 11, wherein the second tier storage is a solid state drive, the third tier storage is a hard disk drive and the fourth tier storage is a cloud storage.

14. The method of claim 11, wherein the second tier storage is a solid state drive, the third tier storage is a hard disk drive and the fourth tier storage is a tape library.

15. A system comprising:

a first tier data storage;

a second tier data storage;

a third tier data storage;

a processor; and computer code executing on the processor, wherein the computer code is configured to:

maintain a first data block on the first tier data storage, said first data block having a capacity limit corresponding to a physical limitation of the second tier storage such that writing data in excess of the capacity limit requires a physical manipulation of the second tier storage;

contemporaneously perform write operations to the second tier data storage and the first data block until the first data block reaches a data capacity limit; and copy the first data block in a single write operation to the third tier data storage.

16. The system of claim 15, wherein the second tier data storage is configured as a cache for the third tier data storage.

17. The system of claim 15, wherein the second tier storage is a solid state drive and the third tier storage is a hard disk drive.

18. The system of claim 15, further comprising a fourth tier data storage, wherein the computer code is further configured to:

maintain a second data block on the second tier data storage;

contemporaneously perform write operations to the third tier data storage and the second data block until the second data block reaches a data capacity limit; and copy the second data block in a single write operation to the fourth tier data storage.

19. The system of claim 18, wherein the third tier data storage is configured as a cache for the fourth tier data storage.

20. The system of claim 18, wherein the first tier data storage is random access memory, the second tier storage is a solid state drive, the third tier storage is a hard disk drive and the fourth tier storage is a cloud storage.

* * * * *